Sept. 23, 1958

P. H. KECK

METHOD AND APPARATUS FOR AMPLIFYING PHOTOELECTRIC CURRENTS

Filed Oct. 2, 1953

2,853,383

INVENTOR.
PAUL H. KECK

BY Harry M. Saragovitz

ATTORNEY

United States Patent Office 2,853,383

Patented Sept. 23, 1958

2,853,383

METHOD AND APPARATUS FOR AMPLIFYING PHOTOELECTRIC CURRENTS

Paul H. Keck, Little Silver, N. J., assignor to the United States of America as represented by the Secretary of the Army Application October 2, 1953, Serial No. 383,945

13 Claims. (Cl. 96—1)

(Granted under Title 35, U. S. Code (1952), sec. 266)

The invention described herein may be manufactured and used by or for the Government for governmental purposes, without the payment of any royalty thereon.

This invention relates to a method of amplifying photoelectric currents and particularly to amplifying primary photoelectric currents within the medium of their origin.

The invention is useful in building up photoelectric currents generated in many different mediums and for many purposes. An especially useful application of the invention is that of intensifying the space charge pattern or the conductivity pattern which results when an exposure is made in the practice of electrostatic electrophotography.

Briefly the procedure and the apparatus used in the invention may be described as follows: A light sensitive element is prepared having the physical conformation of a plate or sheet and capable of recording the photo-electric pattern in varying degrees of conductivity or space charge. Desirably, the element is provided with an electrically conducting support upon which is coated a photosensitive medium in the form of a layer of photoconductive insulation. A transparent conducting layer is then placed in contact with or in close proximity to the sensitive layer. The support and the transparent layer act as a pair of electrodes between which a relatively high electric potential is applied.

The application of the above mentioned potential is controlled in an exact manner since it must be applied for only a very short period of time, for example, a period of less than a microsecond. To apply the potential a pulsing device is used wherein the potential and the duration of the pulse can be adjusted to produce maximum intensification without causing breakdown within the medium. If breakdown were to occur, the coating constituting the sensitive medium would be destroyed.

Furthermore the application of the pulse must be synchronized with the exposure of the sensitive element to a light pattern. Having achieved synchronization the high intensity field created by the pulse stimulates each primary electron, resulting from the exposure, to such an extent that they become the nucleus of a group or avalanche of secondary electrons within the sensitive medium. Thus the photoelectric effect is greatly intensified. The invention as applied to a photoelectric process therefore greatly increases the sensitivity or speed of the sensitive element. Increased photoelectric response may also be achieved in a similar manner for use in other applications of the invention.

It is a primary object of the invention to provide a means for amplifying primary photoelectric currents at their very inception.

A further object of the invention is to obtain a high ratio of amplification of photoelectric currents with the use of a minimum of physical equipment.

A still further object of the invention is to obtain a high ratio of amplification of localized primary photoelectric currents within a high resistance medium.

Other objects and features of the invention will more fully appear from the following description and will be particularly pointed out in the claims.

To present a better understanding of the invention preferred embodiments thereof will be described and illustrated in the accompanying drawings in which.

Figures 1, 2, 3, 4, 5, 6:
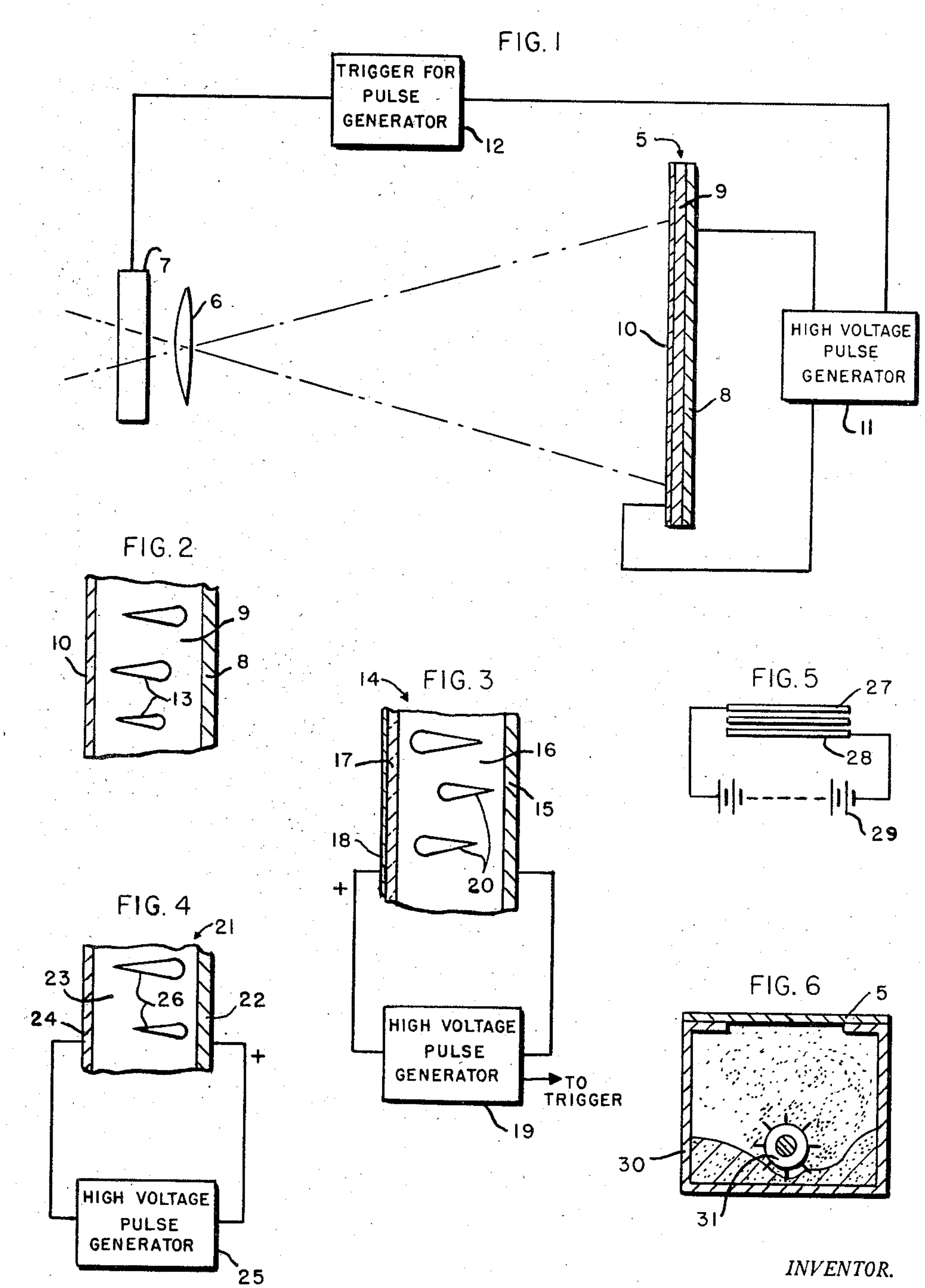
Fig. 1 is a schematic view of an apparatus embodying the invention.
Fig. 2 is an enlarged, detailed sectional view of a photosensitive element used in the apparatus shown in Fig. 1.
Fig. 3 is an enlarged, detailed sectional view of a sensitive element and a portion of its associated apparatus embodying a different form of the invention.
Fig. 4 is an enlarged, detailed sectional view similar to Fig. 3 illustrating still another form of photosensitive element.
Fig. 5 is a schematic illustration of a sensitive element charging device.
Fig. 6 is a schematic illustration of an apparatus for developing the charge pattern upon a sensitive element.

The embodiments of the invention herein presented are representative of the wide field of usefulness of the invention. In Fig. 1 an arrangement is shown schematically for impressing a photographic image upon a photosensitive element 5. The element 5 is placed in the image plane of the lens 6 where, upon operation of the shutter 7, the exposure is made. Elements 5, 6 and 7 constitute the essentials of a conventional camera.

The element 5 may have a flat plate like conformation or it may be a flexible sheet or strip. The element 5 is composed of a base or support 8 of electrically conductive material such as a copper or brass plate upon which is coated the sensitive medium 9 of photoconductive insulation. The coating or layer 9 contains vitreous selenium or anthracene. Any similar substance having the property of generating primary electric currents when exposed to light, may be used. The sensitive layer or medium 9 may be prepared in the conventional or any suitable manner as by bonding the vitreous selenium or other material with an insulating substance such as nitrocellulose or other similar insulating material.

An electrode 10 is placed in contact with or in close proximity to the front face of the layer 9. This electrode must be transparent and desirably is produced by evaporating a thin layer of metal either directly upon the medium 9 or upon a thin transparent removable support of insulating material.

In the conventional method of taking pictures with the sensitive material above described, it is exposed for the correct length of time to an image or pattern of light to be recorded. The sensitive medium is so constituted that local photoelectric charges generated therein by the varying intensity of the light pattern incident thereon will remain stored within the medium for a substantial length of time, during which time the visible picture may be developed thereon in any suitable manner. A simple device for developing a picture from an electrostatic charge upon the sensitive medium is shown in Fig. 6 and will be described in detail hereinafter.

The present invention provides means for amplifying the primary photoelectric currents which are generated within the sensitive medium by the light incident thereon. To accomplish this end a pulse having a relatively high potential is applied to the electrodes 8 and 10 during the exposure period. The resulting field to which the sensitive medium is thus subjected stimulates each primary electron generated within the medium to such an extent that they become the nucleus of avalanches of secondary electrons 13 as shown in Fig. 2. The polarity of the electrodes must be such that the tendency will always be to charge the medium.

A suitable method of applying the field to the medium is to connect the output terminals of a high voltage pulse generator 11 respectively to the electrodes 8 and 10. The pulse generator 11 must be adjusted to produce pulses of very short duration of the order of a fraction of a microsecond. Actually the duration and intensity of the pulse must be adjusted to provide maximum stimulation of the primary photoelectrons but must not cause breakdown of the insulating properties of the medium. It is obvious that if the intensity and duration of the pulse was sufficient to cause breakdown of the sensitive medium the useful properties thereof would be destroyed.

Arrangement is also made to apply the pulse during the exposure period. This may be done in any suitable manner and as shown in the drawing the shutter 7 which is placed in effective relationship to the lens 6 is provided with an electrical connection. This connection may be the output of a conventional flash bulb operating mechanism to be found on many camera shutters and which is energized by actuating the shutter. This connection is led to the input of an electronic trigger circuit 12, the output of which is connected to the pulse generator 11. Thus the activation of shutter 7 is synchronized with the occurrence of the pulse.

As above stated the incidence of the light on the medium 9 creates a charge pattern therein composed of primary photoelectrons. Each of these electrons when stimulated by the pulse induced electric field become the nucleus of secondary electron avalanches indicated schematically at 13 in Fig. 2.

The net result of the procedure outlined above is to produce a charge pattern in the sensitive medium which has been greatly amplified and such amplification has occurred within the medium. The transparent electrode 10 may be removed after exposure of the element and the charge pattern therein developed in any suitable manner such as by dusting with a fine powder having the property of adhering to the element 5 in a layer whose density is proportional to the degree of the charge. The powder layer may then be fixed permanently to the element or it may be offset to a permanent base member thus producing a permanent picture or pattern of the subject. In the latter case the sensitive element may be re-used again and again.

A somewhat different application of the invention is shown in Fig. 3 wherein the sensitive element 14 is prepared in a manner similar to the element 5. A supporting base 15 of conducting material is coated with a layer 16 of vitreous selenium or similar material. This coating or layer functions as the light sensitive medium. A removable front electrode 17 is provided which is made up of a thin transparent insulating sheet having a transparent metallic face 18 to serve as the conductive portion of the electrode. This electrode is placed with its insulating portion in contact with the coating 16. The element 14 thus prepared has its electrodes 15 and 16 connected to the output of a pulse generator 19 which in turn is triggered in synchronism with the exposure of the sensitive medium to a light pattern in the manner described in connection with Fig. 1.

In this form of the invention, however, the sensitive medium 16 is given a homogeneous charge before its exposure and without the electrode 18. This preliminary charge may be applied in any suitable manner such as by means of the device shown in Fig. 5, the details of which will be described hereinafter.

The insulating portion of the electrode 17 is now placed in contact with the outer face of the sensitive medium 16 and its transparent conducting layer 18 is connected to one terminal of a pulse generator 19 while the electrode 15 is connected to its other terminal.

The sensitive medium is then exposed to a light pattern such as that formed by a lens and a high intensity field is simultaneously applied thereto by the pulse generator 19. The light pattern incident upon the medium generates primary photoelectrons each of which become the nucleus of avalanches 20 of secondary electrons thus the photoelectric effect is greatly intensified as in the other forms of the invention but in the present case a discharge takes place from the already charged medium 16. The polarity and intensity of the pulse potential and hence the field characteristics are adjusted so that the discharge is greatly accelerated.

The end result of the above discharge phenomena is to create a charge pattern which is composed of the residue of the original homogeneous charge applied to the element before its exposure. This charge pattern may then be developed in any suitable manner such as by the development procedure described in connection with the other forms of the invention:

It is also possible to apply the principles of the invention to the creation of an intensified conductivity pattern in a light sensitive medium. To accomplish this result the sensitive element illustrated in Fig. 1 may be prepared by coating its base 8 with a material which has a high resistivity in the dark and which has the property of lowering its resistivity in proportion to the intensity of a light pattern to which it is exposed. When such a sensitive element is exposed, a conductivity pattern is created within the medium. The sensitive element may then be temporarily kept in the dark and subsequently subjected to a homogeneous charging operation such as by subjecting it to a high intensity field in the manner illustrated in Fig. 5 of the drawings.

As a result of this charging operation the sensitive medium will assume and retain a charge pattern distributed over its area in proportion to the conductivity of the various areas thereof, the areas of high conductivity assuming a small charge while those retaining high resistivity will assume a relatively high intensity charge.

A suitable substance for use in the sensitive medium in this form of the invention may be a phosphor such as zinc cadmium sulphide phosphor. To prepare the element, its base 8 is coated with the phosphor to provide a sensitive layer as in the other embodiments of the invention. A transparent conductive layer 10 is placed in contact with or in close proximity to the front face of the phosphor medium.

In this form of the invention as in the other forms thereof, when an exposure is made synchronously with the application of a high intensity field the resulting conductivity pattern is intensified by the stimulating effect of the field. Each primary photoelectron becoming the nucleus of an avalanche of secondary electrons. Thus the primary photoelectric currents within the medium are amplified thereby greatly intensifying the resulting conductivity pattern. The pattern thus created may then be charged in any desired manner as by subjecting it to a strong electric field in an apparatus such as that shown in Fig. 5 of the drawings. The charge pattern thus produced upon the medium may then be developed in the conventional manner to provide a visible picture or pattern.

A further valuable application of the invention is found in its use to intensify the visible luminescent image obtainable by incorporating a suitable phosphor in the sensitive medium. A valuable specific application of the above suggested principle is to select a phosphor which is sensitive to infra-red rays and to create the picture by exposing the phosphor to an infra-red image or pattern.

Fig. 4 of the drawings illustrates diagrammatically a sensitive element suitable for use in connection with the above suggested type of phosphor. A sensitive element 21 is composed of a support 22 for conducting material upon which is coated a light sensitive photoconductive insulating medium 23. The medium 23 incorporates a storage type phosphor which becomes luminescent under infra-red light. Such a phosphor may be cadmium selenide containing sulphur and activators such as samarium and europium. Other phosphors included in the standard group VI or group VII may be used.

The coating or medium 23 has applied to its outer face a transparent electrode 24 which together with the metallic base member 22 act as electrodes and are connected to the terminals of a pulse generator 25. In operation the element 21 is placed at the image plane of the lens 6 or exposed to any desired light pattern and a high voltage pulse is applied to the members 22 and 24 simultaneously with the exposure of the sensitive medium.

Prior to its exposure the medium 23 has been irradiated with ultraviolet light to enhance its sensitivity to infra-red light and thereafter is protected from extraneous illumination until ready to make the picture. When exposed to an infra-red image or light pattern as above described photoelectrons are generated within the phosphor medium. The photoelectric currents thus generated cause the phosphor to fluoresce. As in the prior forms of the invention the electric field applied by the pulse generator 25 causes each primary photoelectron within the medium to become the nucleus of avalanches 26 of secondary electrons. The avalanches in turn intensify the charge pattern in the medium which results in the creation of an intensified, brilliant, visible picture. The picture may be observed directly or may be recorded by a conventional photographic process.

Since the phosphor was selected from the storage types available, the picture will persist for a substantial period of time. If further observation is desired or continuous observation necessary, successive pulses may be applied to the sensitive medium at measured intervals to obtain the desired observing condition.

While any suitable means may be employed to apply a homogeneous electric charge to the sensitive medium as in the case where a conductivity pattern is created, a suitable means for this process is shown in Fig. 5, wherein a pair of closely spaced electrodes 27 and 28 are provided and connected to a source of high voltage direct current such as the battery 29. To charge the medium it is placed momentarily between the electrodes 27 and 28 and subsequently handled in a manner to prevent discharge therefrom until it is exposed in the camera or other device.

Various means for developing the charge pattern to produce a visible picture may be employed. An example of such a means is shown in Fig. 6 wherein a container 30 is partially filled with fine powder such as chalk or cork dust. An agitator 31 is rotatably mounted within the container in such a position that it will tend to agitate the dust particles and cause them to become airborne. The floating particles become attracted to the charge pattern on the sensitive element which is placed over an opening in the container 30.

What is claimed is:

1. A method of practicing electrostatic electrophotography comprising preparing a photoconductive insulating layer, exposing the layer to a photographic image and subjecting said layer to a single high voltage pulse synchronized with said exposure, said pulse being of sufficient magnitude but of insufficient duration to cause breakdown of said layer approaching in intensity that which would cause breakdown of the insulation of the layer whereby primary electrons generated by said exposure will become the nucleus of avalanches of secondary electrons within said layer thereby creating an intensified electrostatic pattern in said layer and developing said pattern to create a visible picture.

2. The method of practicing electrostatic electrophotography as set forth in claim 1 in which the single high voltage pulse has a duration of less than 1 microsecond.

3. A photographic method comprising preparing a photo conducting insulating layer, exposing the layer to a pattern of light and simultaneously applying to said layer a single high voltage pulse synchronized with said exposure for a time period of the order of 1 microsecond such treatment being calculated to create avalanches of secondary electrons from the primary electrons activated by the exposure of the layer to light.

4. A method of practicing electrostatic electrophotography comprising preparing a light sensitive medium containing an infra-red luminescent phosphor, irradiating said medium with ultra-violet light, exposing the medium to an image of infra-red light and simultaneously applying a high voltage electric field of short duration to said medium whereby primary photo electrons generated within the medium by the exposure and stimulated by said field become the nucleus of avalanches of secondary electrons which intensify a luminescent picture of the subject appearing upon the sensitive medium.

5. A method of intensifying a photoconductivity pattern comprising preparing a medium containing a substance characterized in that it will have a high, dark resistivity and whose resistivity decreases in proportion to the intensity of light incident thereon, exposing said medium to a light pattern, simultaneously intensifying said pattern by applying thereto a single high voltage pulse of the order of 1 microsecond synchronized with said exposure and thereafter charging said medium thereby creating a charge pattern from the intensified conductivity pattern.

6. Apparatus for producing electrostatic electrophotographic charge patterns comprising a photoconductive insulator element, a camera having means to hold said element in its image plane, a shutter to expose said photoconductive element, a high voltage pulse generator, a pair of electrodes upon opposite faces of said photoconductive element, the electrode facing the camera lens being transparent, connections from the output of said pulse generator to said electrodes and trigger means actuated by said shutter acting in turn to actuate said pulse generator simultaneously with the actuation of said shutter.

7. Apparatus for producing electrostatic electrophotographic pictures comprising a photoconductive insulator element, a camera including a lens and having means to hold said element in its image plane, a shutter for exposing said photoconductive element to a photographic image formed by said lens, a high voltage pulse generator, a pair of electrodes upon opposite faces of said photoconductive element, the electrode facing said lens being transparent, means to conduct the output of said pulse generator to said electrodes, trigger means actuated by said shutter to actuate said pulse generator and means to develop the intensified charge pattern created in said photoconductive element to create a visible picture.

8. Apparatus for producing electrostatic electrophotographic pictures comprising a photoconductive insulation medium containing a substance characterized in that photo electrons are generated therein by exposure to light, a camera having means to hold said elements in the image plane of the camera lens, a shutter to expose said element to a photographic image, a high voltage pulse generator, a pair of electrodes on opposite faces of said element, the electrode facing said lens being transparent, means to conduct the output of said pulse generator to said electrodes, means to actuate said pulse generator during the photographic exposure of said photoconductive element and means to develop the charge pattern created in said photoconductive element to form a visible picture.

9. Apparatus for producing electrostatic, electrophotographic pictures having the elements defined in claim 12 and in which the substance contained in the said photoconductive insulation element is characterized in that it has a high, dark resistivity and when exposed its resistivity is decreased in proportion to the intensity of light incident thereon and means to charge said photoconductive insulating element after its exposure.

10. Apparatus for producing electrostatic, electrophotographic pictures comprising a photo conducting insulation medium containing a substance characterized in that it becomes luminescent when exposed to infra-red light, a lens, means to hold said medium in the image plane of said lens, means to expose said element to an infra-red photographic image, a high voltage pulse generator, a pair of electrodes upon opposite faces of said medium, the electrode facing said lens being transparent, means to conduct the output of said pulse generator to said electrodes, means to actuate said pulse generator during the exposure of the medium whereby an intensified luminescent picture is formed upon the medium.

11. A method for creating an amplified photoelectric charge pattern comprising uniformly charging a photo-conductive insulating medium, exposing the medium to a light pattern and simultaneously applying thereto a single high voltage pulse synchronized with said exposure, said pulse being of sufficient magnitude but of insufficient duration to cause breakdown for 1 microsecond or less, providing a leakage path for the amplified photoelectric currents thus created whereby the residual charge in said medium will constitute a charge pattern representing the light pattern to which the medium was exposed.

12. A method of producing an intensified luminescent photoelectric picture comprising preparing a layer of a photoconductive insulation containing a phosphor which is luminescent in infra-red light, exposing the layer to a pattern of infra-red light and simultaneously applying a high voltage electric field to said layer for 1 microsecond or less whereby the charge pattern created therein will appear as an intensified luminescent representation of the light pattern.

13. In an electrophotographic apparatus having means to produce an image, a photo-conductive insulator in position to receive said image, timing means to expose a first face of said sensitive element to said image, a high voltage pulse generator, a pair of electrodes on opposite sides of said sensitive element, the electrode on one face being transparent, connections from the output of said pulse generator to said electrodes and trigger means actuated by said timing means to actuate said pulse generator.

References Cited in the file of this patent

UNITED STATES PATENTS

| | | |
|---|---|---|
| 2,221,776 | Carlson | Nov. 19, 1940 |
| 2,277,013 | Carlson | Mar. 17, 1942 |
| 2,297,691 | Carlson | Oct. 6, 1942 |
| 2,551,582 | Carlson | May 8, 1951 |
| 2,650,310 | White | Aug. 25, 1953 |
| 2,663,636 | Middleton | Dec. 22, 1953 |
| 2,692,178 | Grandadam | Oct. 19, 1954 |

OTHER REFERENCES

"Phosphor-Type Photoconductive Coatings For Continuous Tone Electrostatic Electrophotography," 1952, Photographic Engineering, vol. 3, No. 1; pages 12–22; page 18 particularly relied upon.